United States Patent [19]

Nolte et al.

[11] Patent Number: 5,248,070

[45] Date of Patent: Sep. 28, 1993

[54] VOLUMETRIC MEASURING/DISPENSING DEVICE

[75] Inventors: Paul A. Nolte, Memphis, Tenn.; Timothy C. Churchill, Olive Branch, Miss.

[73] Assignee: Ingersoll-Dresser Pump Company, Liberty Corner, N.J.

[21] Appl. No.: 937,079

[22] Filed: Aug. 27, 1992

Related U.S. Application Data

[63] Continuation-in-part of Ser. No. 774,925, Oct. 11, 1991, abandoned.

[51] Int. Cl.[5] .............................................. G01F 11/28
[52] U.S. Cl. ................................. 222/442; 222/481.5; 222/452; 222/158; 222/498
[58] Field of Search .............. 222/442, 448, 451, 452, 222/481.5, 483, 484, 505, 510, 185, 158, 155, 498

[56] References Cited

U.S. PATENT DOCUMENTS

| | | | |
|---|---|---|---|
| 149,179 | 3/1874 | Akarm | 222/442 |
| 645,763 | 3/1900 | Surdh | 222/442 |
| 1,494,395 | 5/1924 | Wells | 222/481.5 X |
| 1,719,348 | 7/1929 | Weightman | 222/442 X |
| 2,396,527 | 3/1946 | Osborne | 222/442 X |
| 2,563,930 | 8/1951 | Hamann et al. | 222/442 X |
| 2,834,515 | 5/1958 | Lanyon | 222/442 X |
| 2,972,436 | 2/1961 | Anderson | 222/442 X |
| 3,203,602 | 8/1965 | Kryzer | 222/442 |
| 3,827,610 | 8/1974 | Stiefel, Jr. | 222/440 |
| 4,161,197 | 7/1979 | Stevenson | 141/18 |
| 4,162,745 | 7/1979 | Anderson, Jr. | 222/148 |
| 4,445,627 | 5/1984 | Horak | 222/54 |
| 4,580,703 | 4/1986 | Anderson, Jr. | 222/335 |
| 4,921,138 | 5/1990 | Quinn et al. | 222/155 X |

OTHER PUBLICATIONS

The Bracket Mount Chemeasure—12 page brochure (Relates to AE).
The Model II Chemprobe—9 page brochure (Relates to AC).

Primary Examiner—Andres Kashnikow
Assistant Examiner—Kenneth DeRosa
Attorney, Agent, or Firm—Michael H. Minns

[57] ABSTRACT

A volumetric measuring/dispensing device for liquids is provided which has a measuring container having graduation markings thereon for measuring the quantity of liquid in the container. The container has an upper valve housing and a lower valve housing mounted in the top and bottom of the container. A valve stem having a single handle extends through the upper and lower valve housings and is selectively turnable by a turning the single handle to a selected one of three different positions, namely: a filling position, a closed position and an emptying position. When in the filling position, the upper and lower housings in conjunction with the valve stem respectively provide for the entrance of liquid into the interior of the container while at the same time provide for the exit of air out of the container. When in the closed position, the upper and lower housings in conjunction with the valve stem respectively provide for the closure of all entrances into and exits out of the container by both liquid and air. When in the emptying position, the upper and lower housings in conjunction with the valve stem respectively provide for the entrance of ambient air into the interior of the container while at the same time provide for the exit of liquid out of the interior of the container.

24 Claims, 8 Drawing Sheets

VOLUMETRIC MEASURING/DISPENSING DEVICE

This application is a continuation-in-part of application Ser. No. 774,925, filed Oct. 11, 1991 now abandoned.

BACKGROUND OF THE INVENTION

This invention relates generally to measuring and dispensing devices and more particularly to devices for the volumetric measuring and dispensing of liquids, such as chemical liquids and the like.

In the field of agriculture, large areas of farm lands must be treated with liquid chemicals for destroying weeds, insects, and the like. These liquids are drawn from a source such as large supply containers or drums, measured, and then usually placed into a secondary container or induction tank on the tractor for later transfer to a larger mix tank on the tractor where the chemicals are mixed with a large volume of water. In recent years the chemicals have been marketed in a more concentrated and more expensive form with lesser amounts of the chemicals being necessary. Thus, accuracy in measuring the chemicals becomes more important. Also, it will be understood that any waste of the chemicals, as by leaving a residue of the chemicals in the hoses and the like, becomes more expensive. Additionally, it will be understood that there is the danger of the user coming in contact with the hazardous chemicals.

Various systems have been proposed for measuring the volume of the liquid chemicals and dispensing same. It is typical of such systems to draw the chemical from the supply container into the measuring container by suction and then utilize a hose to transport the liquid to the secondary container for later mixing in the mix tank. Such systems usually are complex and require the manipulation of a number of valves to accomplish the above described operations. The manipulation of a plurality of valves makes it difficult for the user and increases the possibility of inaccurate measuring. Also, due to the use of hoses between the point of measurement and the destination, there is the possibility of leaving a residue of the chemicals in the hoses which thereby causes an inaccuracy in the amount of chemicals in the final water/chemical mixture. Thus, there is a waste of the pure chemicals and also a dilution of the strength of the final water and chemical mixture.

The foregoing illustrates limitations known to exist in present volumetric measuring/dispensing devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a volumetric measuring/dispensing device for liquids which includes a measuring container having an interior and having measuring means for measuring the volume of a quantity of liquid in the interior. The device has a liquid valve moveable between a fill position, a closed position, and an emptying position, and has an air valve moveable between a fill position, a closed position, and an emptying position. Also, the device has means operably joining the liquid valve with the air valve for operating simultaneously the liquid valve and the air valve to selectively move the liquid valve to its fill position while at the same time moving the air valve to its fill position, to move the liquid valve to its closed position while at the same time moving the air valve to its closed position, and to move the liquid valve to its emptying position while at the same time moving the air valve to its emptying position.

The foregoing and other aspects will become apparent from the following detailed description of the invention when considered in conjunction with the accompanying drawing figures.

BRIEF DESCRIPTION OF THE DRAWING FIGURES

DESCRIPTION OF THE PREFERRED EMBODIMENT

Figure 1:
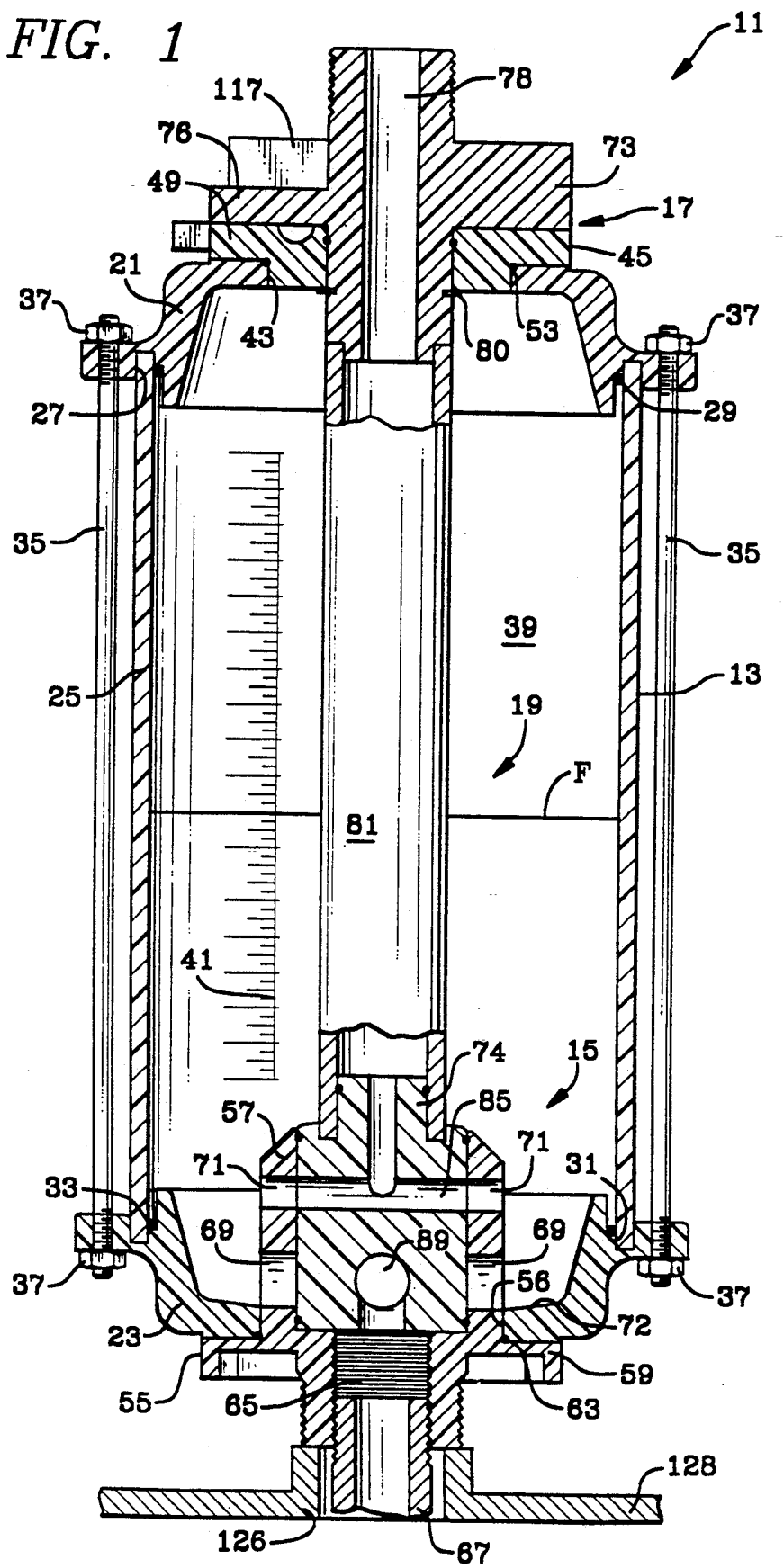
FIG. 1 is a sectional view illustrating an embodiment of the volumetric measuring/dispensing device of the present invention in a filling condition, and with a portion of the secondary container being shown with which the device can be used.
Figure 1A:
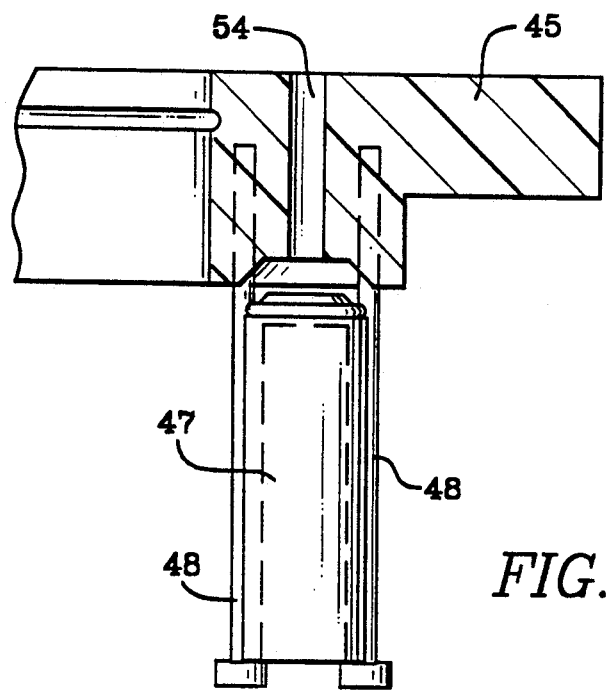
FIG. 1A is a partial cutaway view of the upper valve housing showing the details of the vent float.

Referring now to the drawings, the volumetric measuring/dispensing device 11 of the present invention includes, in general, a measuring container 13, a liquid valve 15, an air valve 17, and a valve operator 19 connecting liquid valve 15 with air valve 17 for simultaneously operating liquid valve 15 and air valve 17. Liquid valve 15 operates both as a fill valve and a drain valve.

Figure 2:
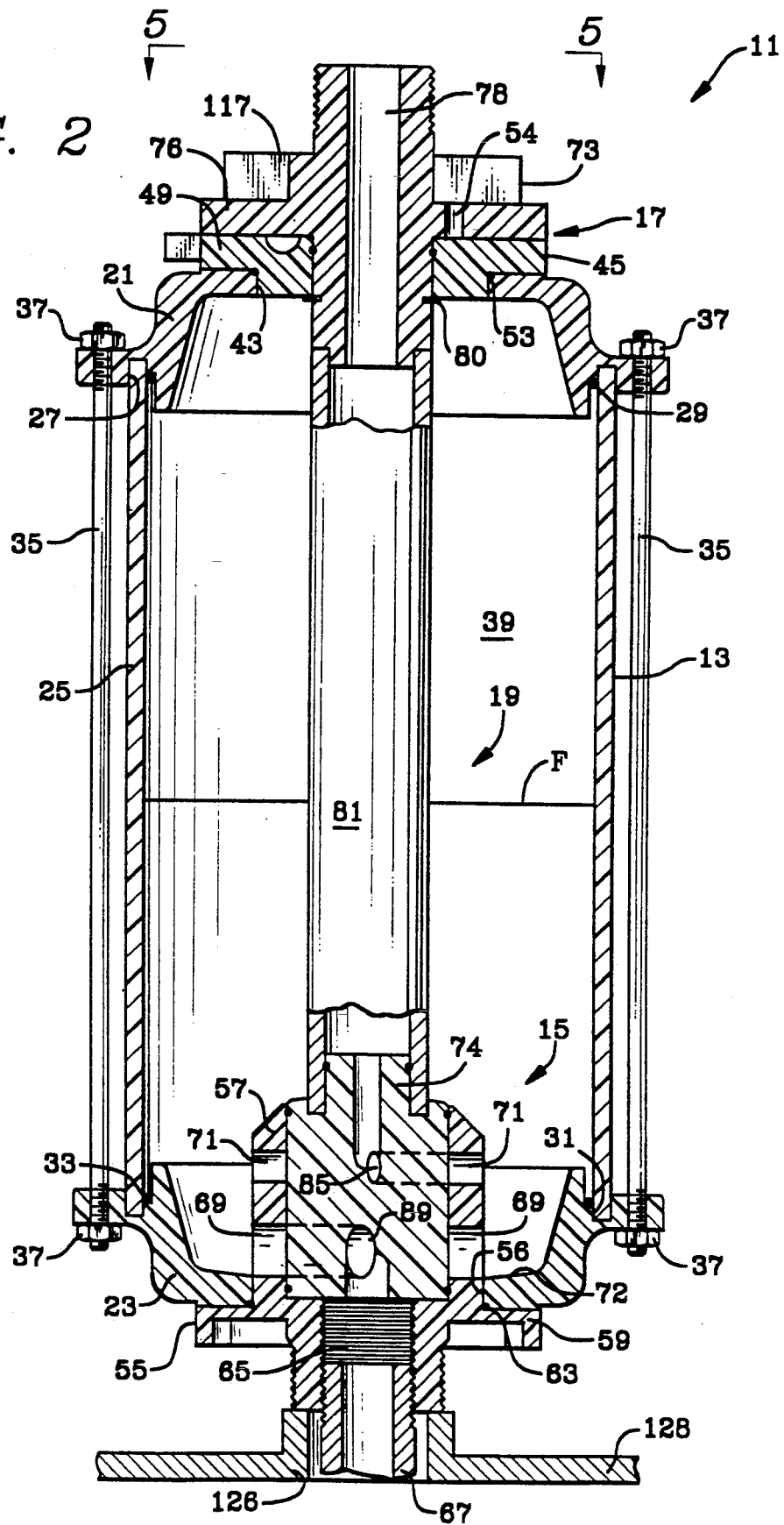
FIG. 2 is a view similar to FIG. 1 but showing the volumetric measuring/dispensing device in a closed condition.
Figure 3:
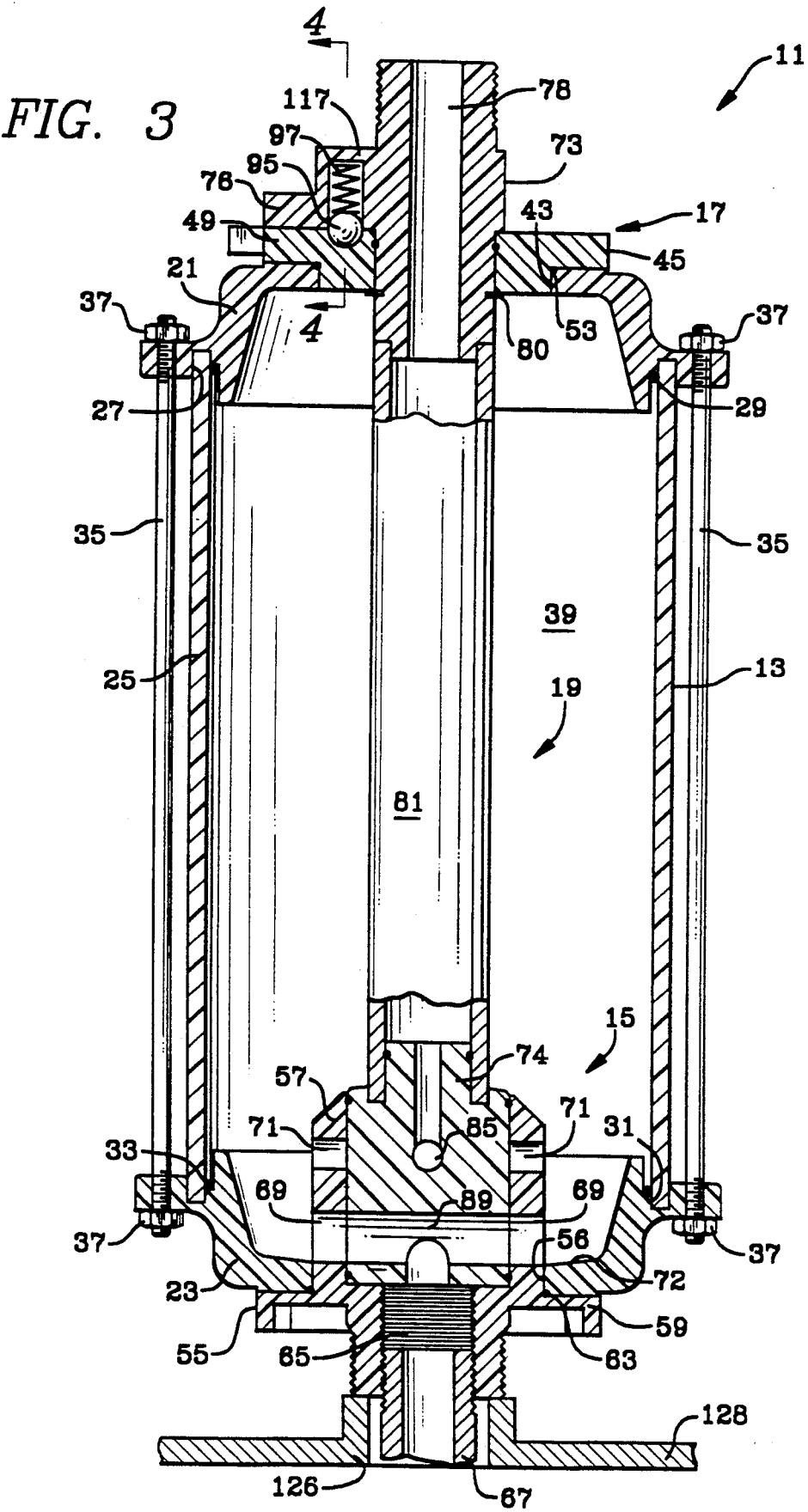
FIG. 3 is a view similar to FIG. 1 but showing the volumetric measuring/dispensing device in an emptying condition.

Measuring container 13 preferably includes a circular top 21, a bottom 23 and a cylindrical wall 25 joining top 21 and bottom 23 shown, for instance, in FIGS. 1-3. The upper edge of cylindrical wall 25 preferably extends into a circular groove 27 provided in the lower surface of top 21 with cylindrical wall 25 being sealed against air leakage and liquid leakage by O-ring 29. The lower edge of cylindrical wall 25 fits into a circular groove 31 provided in the upper surface of bottom 23 and is sealed against air and liquid leakage by O-ring 33. Top 21, bottom 23 and cylindrical wall 25 are secured together by rods 35 which have the opposite ends thereof extending through aligned apertures in top 21 and bottom 23. The rods are threaded at the opposite ends thereof and secured by nuts 37.

In the embodiment shown in FIGS. 1 through 3, top 21, bottom 23, and cylindrical wall 25 are preferably formed of transparent plastic of a type suitable to withstand the various liquids such as chemical liquid F which may be introduced into the container 13 for the measuring thereof. Graduation markings are provided on wall 25 for measuring the quantity of liquid F in container 13.

Top 21 has a central opening 43 therethrough, and an upper, preferably cylindrical, valve housing 45 is fixedly mounted in opening 43 with a circular flange 49 provided on the upper valve housing 45 adjacent the upper end thereof extending outwardly into engagement with the top surface of top 21. A plurality of bolts (not shown), extending through apertures in flange 49 and into threaded sockets in top 21 attach the upper valve housing 45 to top 21. An O-ring 53 the seals upper valve housing 45 to top 21. Upper valve housing 45 has an air passageway 54 extending vertically therethrough from the top surface thereof downwardly into fluid communication with interior 39 of measuring container 13 adjacent top 21 in the upper part of interior 39.

A vent float 47 is attached to the underside of upper valve housing 45 to seal air passageway 54. As the level of liquid F reaches the vent float 47, the vent float 47 floats on the surface of liquid F until the vent float 47 seals the air passageway 54. The vent float 47 is hollow to allow air to be trapped inside the vent float 47 as liquid F rises inside the container 13. A cage 48 secures the vent float 47 to the underside of upper valve housing 45. An O-ring may be used on the vent float 47 to seal the air passageway 54.

Bottom 23 has a central opening 56 therethrough, and a lower, preferably cylindrical, valve housing 55 is fixedly mounted in opening 56 with the body 57 of the lower valve housing 55 extending upwardly through the opening 56 and with a circular flange 59, provided on lower valve housing 55 between the upper and lower ends thereof, extending outwardly into engagement with the bottom surface of bottom 23. A plurality of bolts (not shown), extending through apertures in flange 59 and into threaded sockets in bottom 23 attach the lower valve housing 55 to bottom 23. An O-ring 63 seals the lower valve housing 55 to bottom 23.

The lower portion of lower valve housing 55 provides a liquid outlet 65 which is preferably threaded on the interior thereof to threadedly receive a discharge pipe 67. Lower valve housing 55 has two liquid drain passageways 69 extending radially therethrough on opposite sides of lower valve housing 55 and in fluid communication with interior 39 of measuring container 13. The upper surface 72 of bottom 23 slopes inwardly and downwardly towards liquid drain passageways 69. The lower edges of liquid drain passageways 69 are preferably flush with and not higher than upper surface 72 to provide for complete drainage of liquid from container 13. It should be understood that both the lower valve housing 55 and the upper valve housing 45 are a part of measuring container 13.

Figure 9:
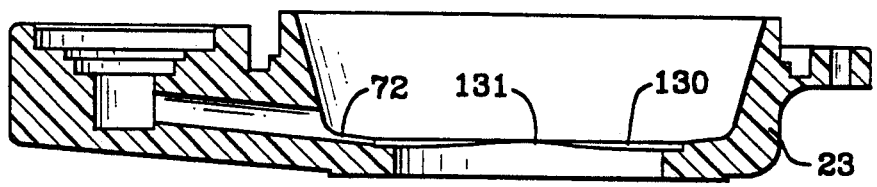
FIG. 9 is a cross-section of the bottom 23 shown in FIG. 8.

A preferred embodiment of bottom 23 is shown in FIG. 9. In addition to the sloping surface 72, a drain groove 130 is provided around central opening 56 adjacent the lower valve housing 55 to assure complete drainage of liquid from container 13. The surface of drain groove 130 is preferably flush with the lower edges of liquid drain passageways 69. Further, drain groove 130 slopes downward from two high points 131 towards two low points adjacent the liquid drain passageways 69.

Lower valve housing 55 also has two liquid fill passageways 71 extending radially therethrough on opposite sides of lower valve housing 55 and in fluid communication with the interior 39 of measuring container 13. The liquid fill passageways 71 are axially located above the liquid drain passageways 69.

A cylindrical valve operator 19 is turnably mounted in the upper valve housing 45 and the lower valve housing 55 for selective turning movement between a fill position shown in FIG. 1 to establish a filling condition of device 11, a closed position shown in FIG. 2 to establish a sealingly closed condition of device 11, and an emptying position shown in FIG. 3 to establish an emptying condition of device 11. Valve operator 19 is comprised of an upper valve stem 73 and a lower valve stem 74 connected by central conduit 81.

Upper valve stem 73 has an inlet air aperture 75 extending vertically through a flange 76 fixedly provided on upper valve stem 73. Inlet air aperture 75 communicates with the ambient air, that is, the outside atmosphere adjacent device 11. Also, upper valve stem 73 has an outlet air aperture 77 that extends vertically through flange 76 and communicates with the ambient air. Inlet air aperture 75 and outlet air aperture 77 are spaced 90 degrees apart as shown by the angle designated by the arrow 79 in FIG. 5. A snap ring 80 is provided in a groove in upper valve stem 73 with the snap ring 80 slidably engaging the lower end of upper valve housing 45 to prevent upward movement of valve stem 73 relative to container 13 as, for instance, shown in FIGS. 1 through 3.

Additionally, upper valve stem 73 contains a fluid passage 78 which is in fluid communication with a liquid inlet or fitting 83 at the upper end of upper valve stem 73. Fitting 83 is preferably a right angular elbow fitting. Fluid passage 78 is also in fluid communication with central conduit 81.

Lower valve stem 74 is provided with liquid fill apertures 85 in fluid communication with central conduit 81 and which extend outwardly through the wall of lower valve stem 74. Liquid fill apertures 85 extend radially through lower valve stem 74 and are spaced 180 degrees apart, as best seen in FIGS. 1 through 3. Additionally, lower valve stem 74 has liquid drain channels 89 at the lower end of lower valve stem 74. Liquid drain channels 89 are spaced 180 degrees apart and each channel 89 is spaced 90 degrees from liquid fill apertures 85, as best seen in FIGS. 1 through 3. The liquid drain channels 89 extend inwardly along the lower end of lower valve stem 74, and the inner ends of the channels 89 are joined together as shown in FIG. 3 to establish a single channel portion extending from side to side of the lower valve stem 74. Liquid drain channels 89 are in fluid communication with liquid outlet 65.

Figure 10:
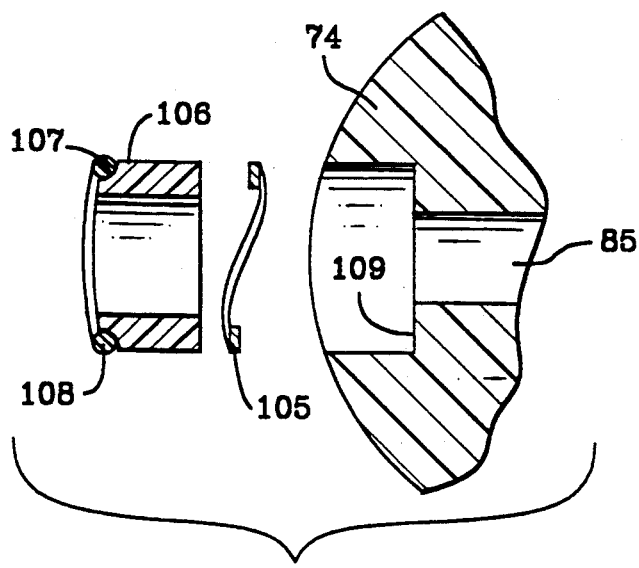
FIG. 10 is a partial cutaway of the valve stem showing the details of the valve inserts.

FIG. 10 shows the details of a preferred embodiment of a self-adjusting sealing system for sealing between the lower valve housing 55 and the lower valve stem 74. Valve inserts 106 are positioned within the liquid fill apertures 85 and liquid drain channels 89. A shoulder 109 is located within each liquid fill aperture 85 and each liquid drain channel 89. Wave springs 105 are located between each shoulder 109 and each valve insert 106. The wave spring 105 biases the valve insert 106 towards the inner wall of the lower valve housing 55.

The outer surface of the valve insert 106 is curved to match the curvature of the inner wall of the lower valve housing 55. The outer surface of the valve insert 106 contains an arcuate groove 107. An O-ring 108 is placed in this groove. The depth of groove 107 is approximately one-half of the thickness of the O-ring 108. The combination of the curved outer surface of the valve insert 106, the groove 107 and the O-ring 108 provides better sealing between the lower valve stem 74 and the lower valve housing 55. Wave spring 105 biases the valve insert 106 and the O-ring 108 into contact with the inner wall of the lower valve housing 55 to further improve the sealing. The wave spring also compensates for any wear of the O-ring 108.

When valve operator 19 is in the fill position shown in FIG. 1, liquid fill apertures 85 are in fluid communication respectively with liquid fill passageways 71 to permit the flow of liquid from central conduit 81 to interior 39 of measuring container 13. Also, when valve operator 19 is in the fill position, air outlet aperture 77 is in fluid communication with air passageway 54 for exhausting air from the interior 39 of the container 13 to the outside ambient air during the filling of the container.

As the level of liquid F rises and approaches top 21, vent float 47 will rise and seal air passageway 54 to prevent liquid F from escaping through air passageway 54.

When valve operator 19 is in the closed position shown in FIG. 2, liquid and air flow to and from interior 39 of measuring container 13 is blocked off. More specifically, when valve operator 19 is in the closed position which is between and preferably half way between the fill and the emptying positions, the inlet air aperture 75 and outlet air aperture 77 will be angularly spaced from air passageway 54 and a solid or unapertured portion of flange 76 will block the flow of air through air passageway 54. Also, when valve operator 19 is in the closed position, liquid drain channels 89 will be angularly spaced from liquid drain passageways 69, and liquid fill apertures 85 will be angularly spaced from liquid fill passageways 71 so that solid portions of lower valve stem 74 will block the flow through liquid fill and drain passageways 69, 71, as best seen in FIG. 2.

Additional O-rings are provided for substantially sealing off container 13 from all air and liquid flow into and out of the interior 39 of container 13 when container 13 is in the closed condition.

When valve operator 19 is in the emptying position shown in FIG. 3, liquid drain channels 89 are in fluid communication with liquid drain passageways 69 to permit flow of liquid from interior 39 of measuring container 13 to fluid outlet 65. Also, when valve operator 19 is in the emptying position, inlet air aperture 75 is in fluid communication with air passageway 54 for allowing outside ambient air to enter the interior 39 of the container 13 during the emptying of the container.

From the foregoing it will be understood that air valve 17 is comprised of upper valve housing 45 and upper valve stem 73, which includes inlet air aperture 75, outlet air aperture 77, air passageway 54, portions of flange 76, and the structure related to these elements; and that liquid valve 15 is comprised of lower valve housing 55 and lower valve stem 74, which includes liquid drain passageways 69, liquid fill passageways 71, liquid fill apertures 85, liquid drain channels 89, and the structure related to these elements. Also, it will be understood that when valve operator 19 is in the fill position, the closed position, and the emptying position, the air valve 17 and the liquid valve 15 are in the fill position, the closed position, and the emptying position, respectively, as best seen in the respective FIGS. 1, 2, and 3.

Figure 4:
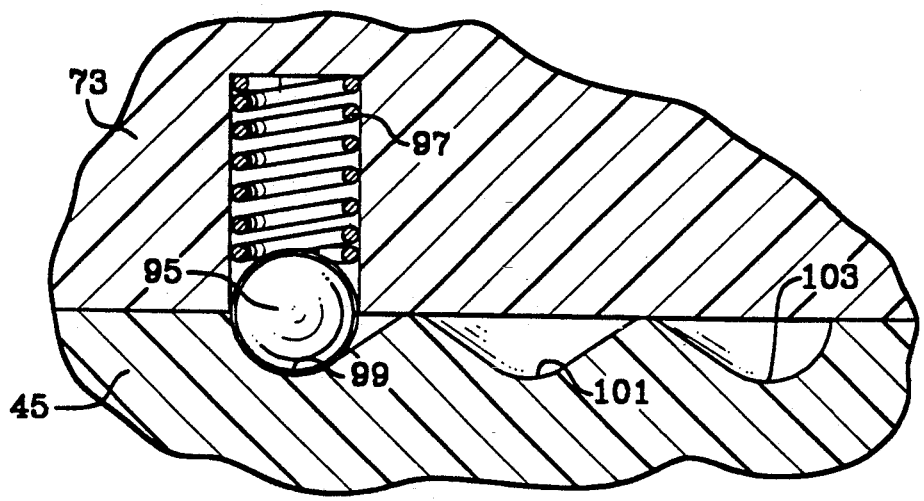
FIG. 4 is a partial cutaway view of the upper valve housing and upper valve stem taken on line 4—4 of FIG. 3 showing the details of the ball detent.

A detent is preferably provided in the form well known to those skilled in the art which includes a ball 95 and a spring 97 as, for instance, shown in FIGS. 3 and 4. Ball 95 selectively engages one of concave depressions 99, 101 and 103 to temporarily hold valve operator 19 (including the air valve 17 and the liquid valve 15) selectively in the fill position, the closed position, or the emptying position. Also, if desired, in place of or in addition to depressions 99, 103, detent means in the form of suitable stops may prevent valve operator 19 from going beyond the fill position and the emptying position.

Figure 5:
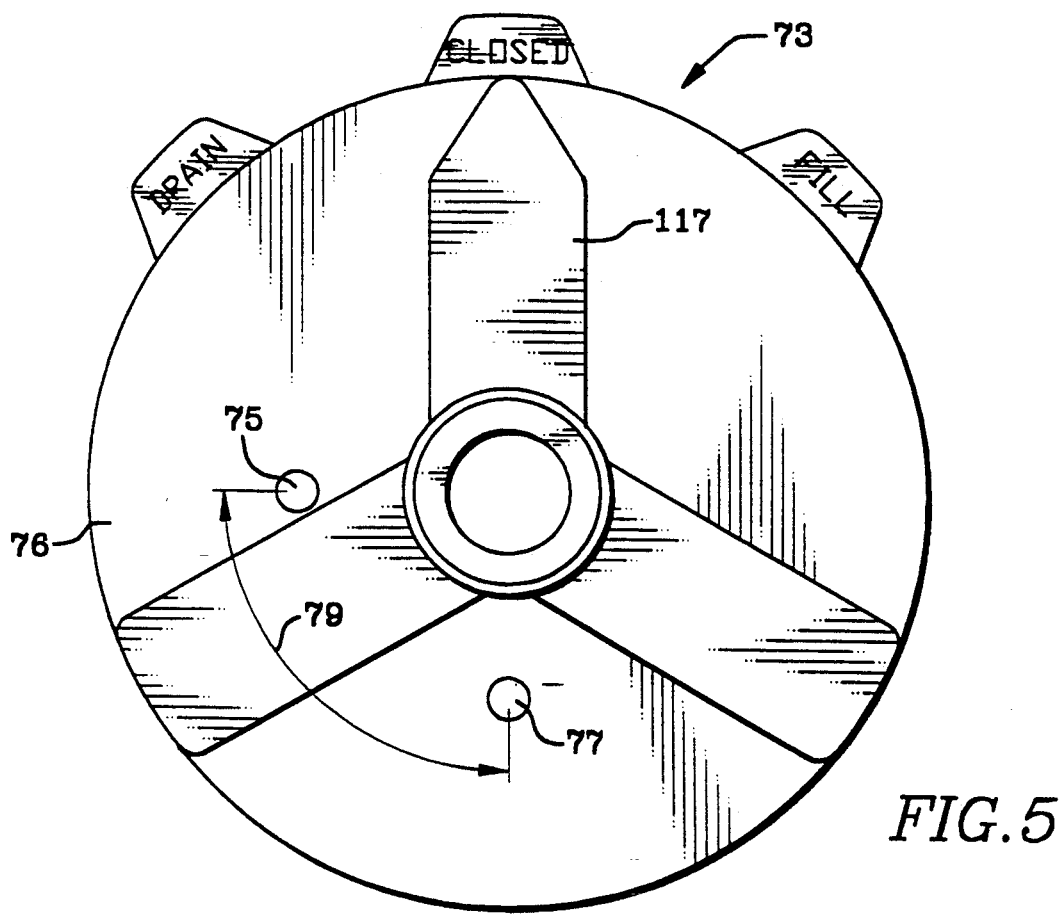
FIG. 5 is a plan view taken on line 5—5 of the device shown in FIG. 2 with certain parts removed for purposes of illustration.

A handle 117 is fixedly attached to upper valve stem 73 by suitable means well known to those skilled in the art, such as a set screw. More specifically handle 117 is preferably formed as part of upper valve stem 73 as shown in FIG. 5. Fitting 83 is preferably internally threaded at its outer end to threadedly receive an attachment fitting for a hose 125 or the like.

Figure 7:
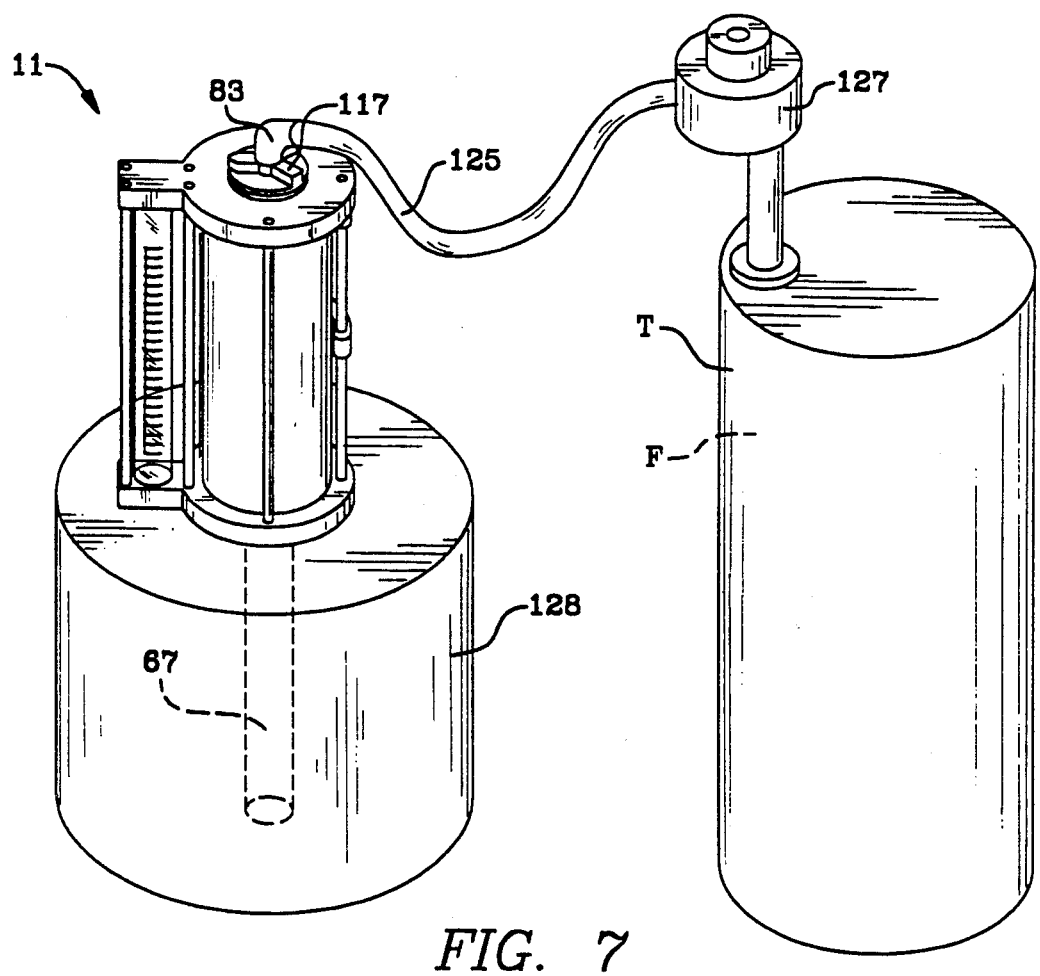
FIG. 7 is a perspective view of a preferred embodiment of the volumetric measuring/dispensing device.

In the operation of device 11, hose 125 may be connected to a source of liquid F which for example is liquid F in the tank T as depicted in FIG. 7. Liquid F is pumped through the hose 125 by the pump 127 to the liquid inlet 83, or alternatively liquid may be gravity fed from a tank such as tank T placed at a higher level than device 11.

After device 11 is connected to the source of liquid F, the user then turns handle 117 to the fill position shown in FIG. 1 and by observing the graduation markings 41, the user may fill measuring container 13 with the desired amount of chemical liquid F. When the desired amount of chemical liquid F is in the container 13, the user shuts off the flow of liquid F and turns the handle 117 to the closed position shown in FIG. 2. The user may then transport the measured liquid to an induction tank or secondary container 128 (see FIG. 7), into which container the liquid may be emptied by turning handle 117 to the emptying position shown in FIG. 3.

It will be understood that when handle 117 is turned, as above described, the following parts will be turned therewith: fitting 83, the end of hose 125 and the valve operator 19 including upper valve stem 73, central conduit 81 and lower valve stem 74. Thus, it will be further understood that the position of handle 117 and upper valve stem 73 when in the fill position is disposed 90 degrees from the position of handle 117 and upper valve stem 73 when the valve operator 19 is in the emptying position, and that the position of handle 117 and upper valve stem 73 when the valve operator 19 is in the closed position is between the positions of handle 117 and upper valve stem 73 when the valve operator 19 is in the fill and emptying positions.

In the use of the device 11 in the environment shown in FIGS. 1-5 and 7, the discharge pipe 67 is a short and preferably straight piece of pipe, as for example six inches in length, which extends down through an opening 126, see FIG. 1, into the interior of secondary container or induction tank 128 with the device 11 sitting on top of tank 128. Thus, it will be understood that with the short discharge pipe 67 there is no unwanted accumulation or residue of chemicals left in the pipe as with other systems which use hoses to transport the chemicals after measuring, since with the device 11 substantially all of the liquid will drip downwardly out of the discharge pipe 67 into the tank 128. If desired, the pipe could also be replaced with a well-known dry break fitting.

Figure 6:
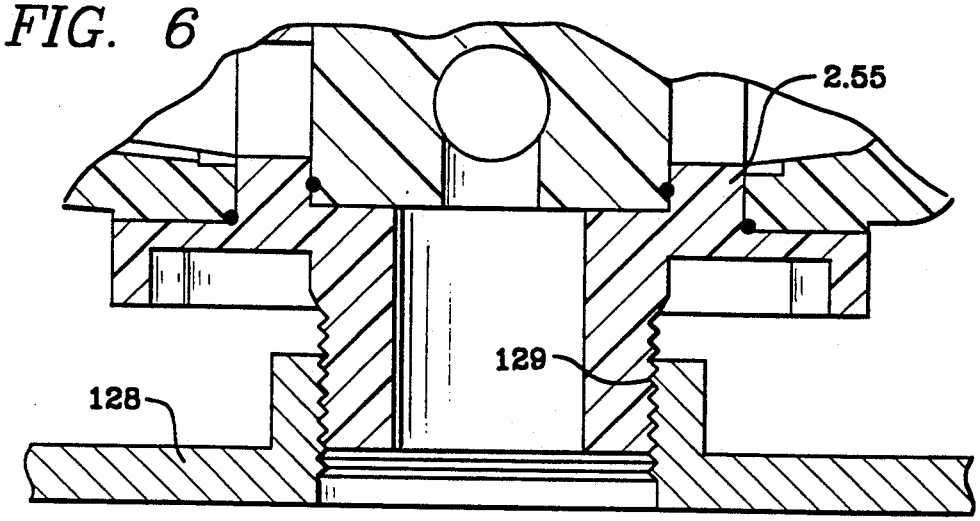
FIG. 6 is a fragmentary sectional view showing an alternative means of connecting the device of the present invention with a secondary container.

In the alternate embodiment shown in FIG. 6, rather than having a discharge pipe 67 as in the principal embodiment, the lower end of lower valve housing 2.55 is coupled to a removable top of a secondary container or induction tank 128 as by externally threading the lower end of valve housing 2.55 and threading it into the internally threaded aperture 129 in the top of induction tank 128. If desired, the device 11 may be left permanently on the induction tank and used for storage of chemicals, as for example if there is an excess of the amount of chemicals measured greater than that needed. Thus, rather than disposing of the chemicals, the device 11 may be left in place on the induction tank until the next use of the chemicals. One other common means of operation would be to have the container mounted permanently at the pumping location with a hose running from the container discharge to the suction port of a centrally located water pump. The container would be filled to a desired amount, at which point handle 117 would be turned to the emptying position while the water pump loads water to a spraying device. This creates a suction within the container which is then emptied through the hose into the pump which then moves the emptied contents of the container into the spraying device.

Figure 8:
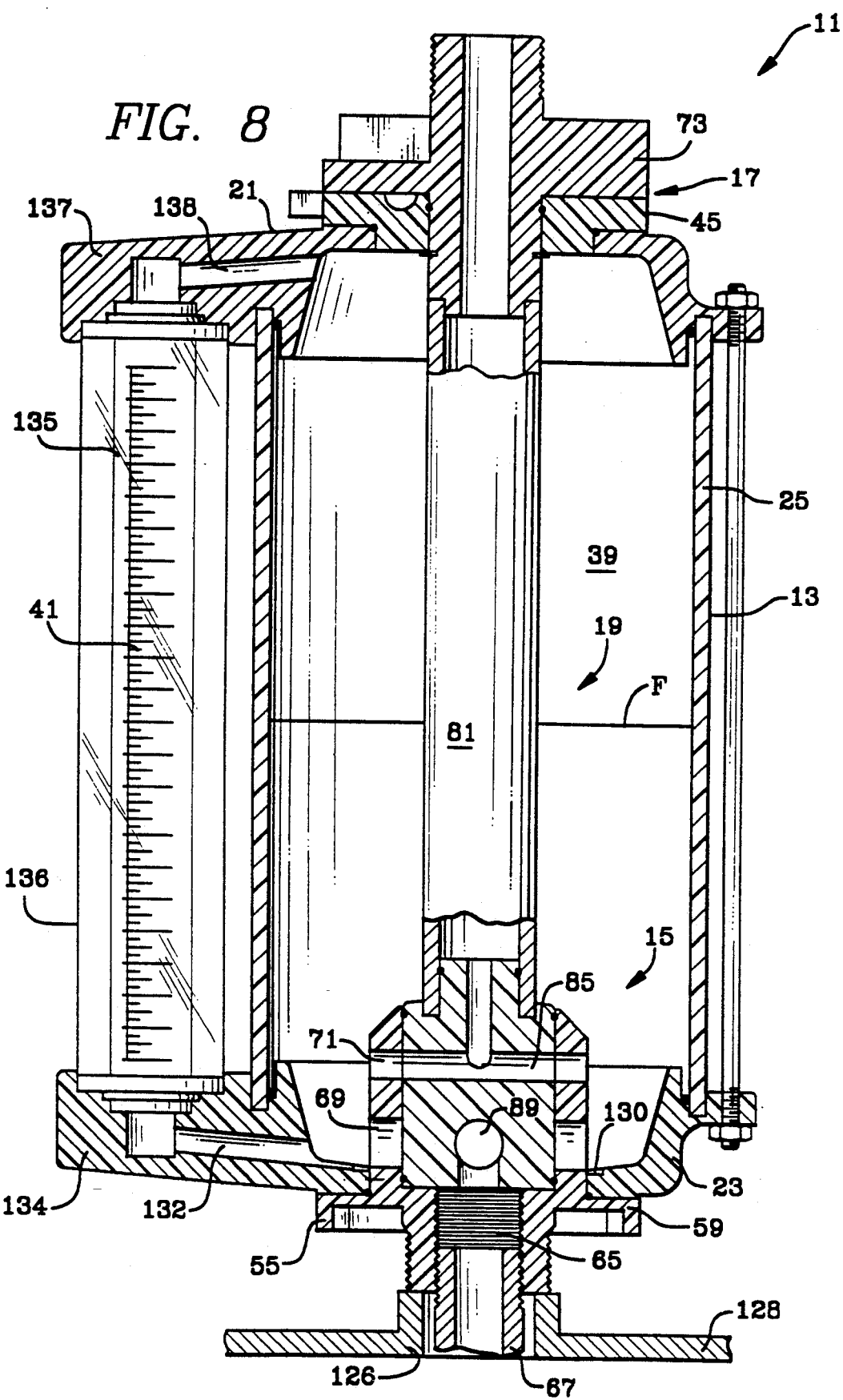
FIG. 8 is a sectional view, similar to FIG. 1, illustrating the preferred embodiment of the volumetric measuring/dispensing device in a filling condition.

FIGS. 8 and 9 show the preferred embodiment of the volumetric measuring/dispensing device 11. Instead of using a transparent plastic cylindrical wall 25 as shown in FIGS. 1 through 3, a separate dual sight glass 135, 136 is provided with graduation markings 41 is used to measure the quantity of liquid F in container 13. The top 21 and bottom 23 each have a portion which extends outward from the circular sections of the top 21 and 23. These extended portions form an upper sight glass support 137 and a lower sight glass support 134, respectively.

Each sight glass support contains an enlarged circular aperture. Two sight glasses, an inner sight glass 135 and an outer sight glass 136 are held within these enlarged circular apertures. Plastic spacers and O-rings are used to position and seal the sight glasses 135, 136 to the sight glass supports 134, 137. The graduation markings 41 may be placed on either sight glass 135, 136 or may be placed on a decal located between the two sight glasses.

Preferably, an inner sight glass 135 of glass and an outer plastic sight glass 136 are used. Although, a single sight glass may be used. The inner sight glass 135 is glass to provide chemical resistance and the outer sight glass 136 is plastic to provide breakage resistance. In the event the inner sight glass 135 is broken, the outer sight glass 136 will contain liquid F to allow the inner sight glass to be replaced.

Each sight glass support 134, 137 contains a vent or fluid passage 132, 138, respectively. Through these passages 132, 138 the inner sight glass 135 is in fluid communication with the interior 39 of container 13.

Figure 11:
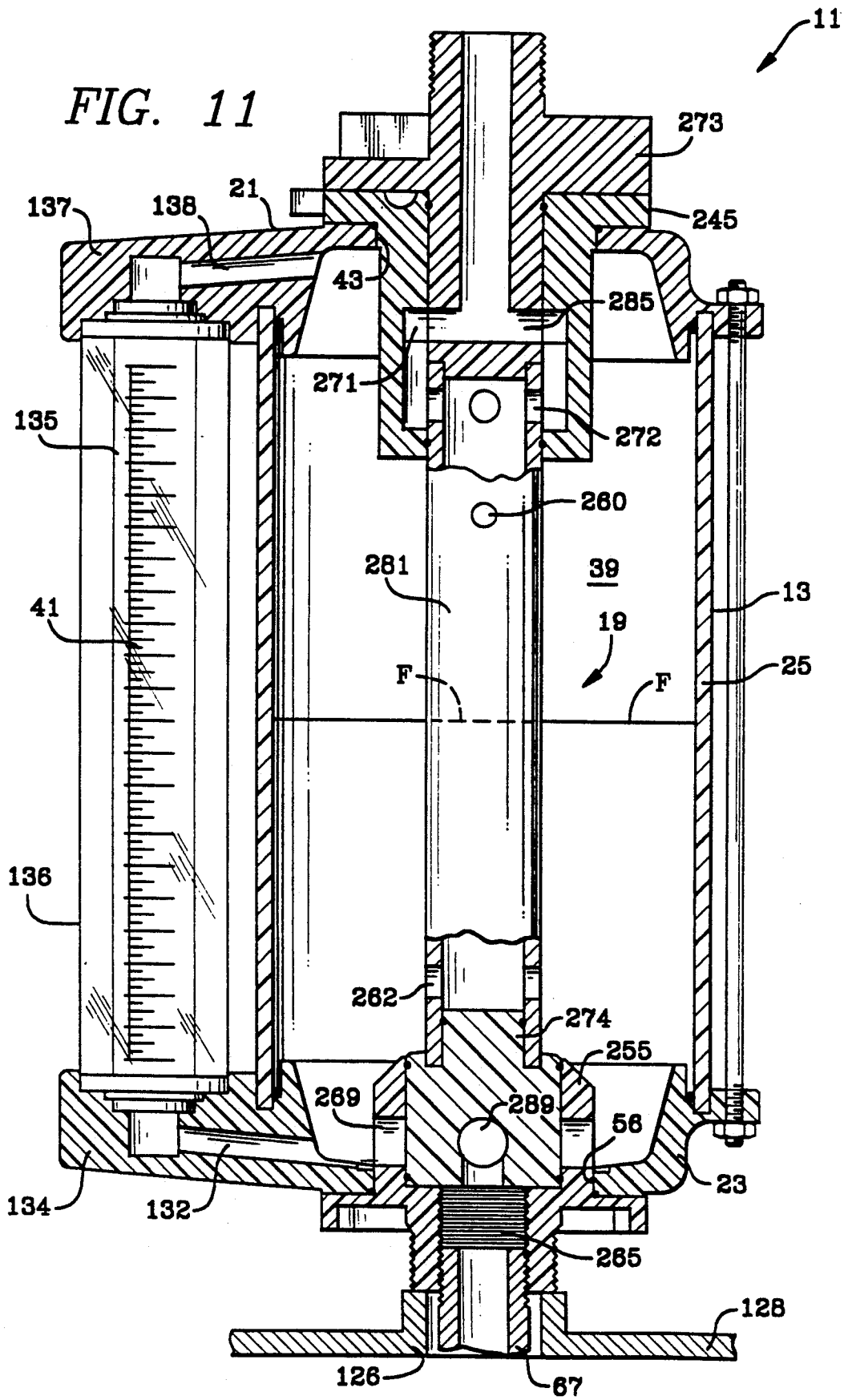
FIG. 11 is a sectional view, similar to FIG. 8, illustrating another embodiment of the volumetric measuring/dispensing device in a filling condition.

FIG. 11 shows another embodiment of the volumetric measuring/dispensing device 11. The liquid fill function and the liquid drain function are separate from one another rather than being a unitary piece. The liquid fill function is part of the upper valve housing 245 and upper valve stem 273 and the liquid drain function is the only function of the lower valve housing 255 and lower valve stem 274.

The upper valve housing 245 is fixedly mounted in opening 43 of top 21. Upper valve housing 245 has an air passageway 54 extending vertically therethrough from the top surface thereof downwardly into fluid communication with interior 39 of measuring container 13. Upper valve housing 245 also has two liquid fill passageways 271 extending radially therethrough on opposite sides of upper valve housing 245. Liquid fill passageways 271 are in fluid communication with a central conduit 281 via upper fill apertures 272.

The lower valve housing 255 is fixedly mounted in opening 56 of bottom 23. The lower portion of lower valve housing 255 provides a liquid outlet 265. Lower valve housing 255 has two liquid drain passageways 269 extending radially therethrough on opposite sides of lower valve housing 255 and in fluid communication with interior 39 of measuring container 13.

A cylindrical valve operator 19 is turnably mounted in the upper valve housing 245 and the lower valve housing 255 for selective turning movement between a fill position, a closed position, and an emptying position. Valve operator 19 is comprised of upper valve stem 273 and lower valve stem 274 connected by central conduit 281.

Upper valve stem 273 is provided with inlet air aperture 75 and outlet air aperture 77 as discussed above for the embodiment shown in FIGS. 1 through 3. Upper valve stem 274 is also provided with liquid fill apertures 85. Liquid fill apertures 285 extend radially through upper valve stem 274 and are spaced 180 degrees apart.

Lower valve stem 274 has liquid drain channels 289 at the lower end of lower valve stem 274. Liquid drain channels 289 are spaced 180 degrees apart and each channel 289 is spaced 90 degrees from liquid fill apertures 285. The liquid drain channels 289 extend inwardly along the lower end of lower valve stem 274. Liquid drain channels 289 are in fluid communication with liquid outlet 265.

A plurality of lower fill apertures 262 are provided on the lower end of central conduit 281 proximate the lower valve stem 274. When the volumetric measuring/dispensing device 11 is in the fill position, liquid F will flow into the upper valve stem 273 through liquid fill apertures 285 into liquid fill passageways 271. Liquid F then enters central conduit 281 via upper fill apertures 272. Liquid F will exit central conduit 281 and flow into the interior 39 of container 13 through lower fill apertures 262. The lower fill apertures 262 are located as low as possible in container 13 to prevent any foaming of liquid F which might occur if the apertures 262 were located higher.

The advantage of the embodiment shown in FIG. 11 is that central conduit 281 will empty of liquid F when container 13 is emptied by placing valve operator 19 in the emptying position. Central conduit 81 shown in the embodiments in FIGS. 1 through 3 and FIG. 8 does not empty when container 13 is emptied.

To provide better flow out of conduit 281 when emptying container 13, central conduit vent apertures 260 may be provided adjacent upper valve housing 245. Central conduit 281 is then in fluid communication with the upper portion of container 13 to allow the interior of central conduit 281 to vent when container 13 is being emptied. Small check valves (not shown) may be connected to central conduit vent apertures 260 to prevent liquid F from flowing out of vent apertures 260 when filling container 13. Any flow out of these vent apertures 260 could cause foaming of liquid F.

The operation of the volumetric measuring/dispensing device 11 shown in FIG. 11 is the same as for the embodiment shown in FIGS. 1 through 3, except for the differences discussed above.

Some of the advantages resulting from the invention described above are as follows:

(1) The volumetric measuring/dispensing device 11 is simple and easy to operate by allowing the operator to selectively control the filling of the measuring container, the closing of the measuring container, and the emptying of the measuring container by turning the single handle 117 to a selected one of three different positions.

(2) The device 11 provides a self-contained volumetric measuring/dispensing device that allows its user to measure a known amount of chemical liquid in a measuring container, transport the measured liquid to a secondary container, and then to empty that known amount of liquid completely from the measuring container to the secondary container without exposure of the operator to the chemical liquid transferred.

(3) With its tapered bottom, the device 11 can be completely emptied so that flushing the device out with water to assure complete chemical evacuation, like many volumetric devices presently on the market, is not required.

(4) The small compact design allows the device 11 to be easily adapted to mount directly onto the secondary container or induction tank where, if desired, it could remain permanently.

Having described the invention, what is claimed is:

1. A volumetric measuring/dispensing device for liquids comprising:
   a measuring container including measuring means for measuring the volume of a quantity of liquid in the container;
   a liquid valve movable between a fill position for permitting liquid to flow into the container, a closed position for sealingly blocking the flow of liquid into and out of the container, and an emptying position for permitting liquid to flow out of the container;
   an air valve movable between a fill position for permitting air to exit the container, a closed position for sealingly blocking the flow of air into and out of the container, and an emptying position for permitting ambient air to flow into the container; and
   means for operating simultaneously the liquid valve and the air valve selectively to move the liquid valve to its fill position while at the same time moving the air valve to its fill position, to move the liquid valve to its closed position while at the same time moving the air valve to its closed position, and to move the liquid valve to its emptying position while at the same time moving the air valve to its emptying position, the means for operating simultaneously the liquid valve and the air valve joining the liquid valve to the air valve, the means for operating simultaneously the liquid valve and the air valve comprising an axially extending fluid conduit for conducting fluid external to the measuring container to the liquid valve.

2. The volumetric measuring/dispensing device of claim 1 wherein the liquid valve comprises a stationary first portion and a second portion, the second portion being rotatable relative to the first portion, the first portion having at least one liquid fill passageway and at least one liquid drain passageway, the at least one liquid fill passageway and the at least one liquid drain passageway not being in fluid communication with one another, the second portion having at least one liquid fill aperture and at least one liquid drain channel, the at least one liquid fill aperture and the at least one liquid drain channel not being in fluid communication with one another.

3. The volumetric measuring/dispensing device of claim 1 wherein the measuring means comprises a transparent tube external to the measuring container, both ends of the transparent tube being in fluid communication with the measuring container, the transparent tube having graduation markings for indicating the quantity of liquid in the measuring container.

4. A volumetric measuring/dispensing device for liquids comprising:
   a measuring container including measuring means for measuring the volume of a quantity of liquid in the container;
   a liquid valve movable between a fill position for permitting liquid to flow into the container, a closed position for sealingly blocking the flow of liquid into and out of the container, and an emptying position for permitting liquid to flow out of the container; the liquid valve comprising: a cylindrical portion, the curved portion of the cylindrical portion defining a surface; a fixed portion having a circular aperture, the cylindrical portion being movably mounted within the circular aperture, the cylindrical portion and the fixed portion each having a plurality of liquid passageways therein; and a means for sealing each liquid passageways in the cylindrical portion to the fixed portion circular aperture, the means for sealing comprising: an annular ring inserted in each liquid passageway adjacent the surface of the cylindrical portion, each liquid passageway having a shoulder, the face of the annular ring adjacent the circular aperture being curved to match the curvature of the circular aperture and the face of the annular ring adjacent the circular aperture having an arcuate groove about its outer circumference; an O-ring being located in the arcuate groove; and a means for biasing the annular ring towards the fixed portion of the liquid valve being located between the shoulder and the annular ring;
   an air valve movable between a fill position for permitting air to exit the container, a closed position for sealingly blocking the flow of air into and out of the container, and an emptying position for permitting ambient air to flow into the container; and
   means for operating simultaneously the liquid valve and the air valve selectively to move the liquid valve to its fill position while at the same time moving the air valve to its fill position, to move the liquid valve to its closed position while at the same time moving the air valve to its closed position, and to move the liquid valve to its emptying position while at the same time moving the air valve to its emptying position, the means for operating simultaneously the liquid valve and the air valve joining the liquid valve to the air valve.

5. A volumetric measuring/dispensing device for liquids comprising:

a measuring container including measuring means for measuring the volume of a quantity of liquid in the container, the measuring container including a liquid outlet;

a liquid passageway communicating with the interior of the container;

an air passageway communicating with the interior of the container;

a valve stem turnably mounted in the measuring container for selective turning movement between a fill position to establish a filling condition of the device, a closed position to establish a closed condition of the device, and an emptying position to establish an emptying condition of the device, the valve stem including: a liquid inlet; an axially extending fluid conduit in fluid communication with the inlet for conveying liquid through the valve stem; a liquid aperture for communicating the conduit with the liquid passageway when the valve stem is in the fill position to permit flow of liquid from the conduit into the container when the valve stem is in the fill position; a liquid channel for communicating the interior of the container with the liquid outlet when the valve stem is in the emptying position to permit flow of liquid from the interior of the container to the liquid outlet when the valve stem is in the emptying position; an inlet aperture for communicating the air passageway with the ambient air when the valve stem is in the emptying position to permit flow of air from outside the container into the interior of the container when the valve stem is in the emptying position; and an outlet aperture for communicating the air passageway with the ambient air when the valve stem is in the fill position to permit flow of air from the interior of the container when the valve stem is in the fill position;

a means for sealingly blocking the flow of liquid from the conduit to the interior of the container and for sealingly blocking the flow of liquid from the interior of the container when the valve stem is in the closed position; and a first means for sealingly blocking the flow of air from and to the interior of the container when the valve stem is in the closed position.

6. The volumetric measuring/dispensing device of claim 5 further comprising a handle fixedly attached to the valve stem for turning the valve stem, the position of the handle and the valve stem when the valve stem is in the fill position is disposed 90 degrees from the position of the handle and the valve stem when the valve stem is in the emptying position.

7. The volumetric measuring/dispensing device of claim 6 further comprising a detent operably engaging the valve stem for temporarily holding the valve stem selectively in the fill position, the closed position or the emptying position.

8. The volumetric measuring/dispensing device of claim 7 wherein the container has a bottom, the bottom having an upper surface sloping inwardly and downwardly towards the liquid passageway.

9. The volumetric measuring/dispensing device of claim 5 wherein the container has a bottom, the bottom having an upper surface sloping inwardly and downwardly towards the liquid passageway, the bottom having a circular aperture adjacent to and extending around the liquid passageway, the bottom adjacent the circular aperture further sloping downwardly towards the liquid passageway from a high point distal the liquid passageway to a point proximate the liquid passageway.

10. The volumetric measuring/dispensing device of claim 5 further comprising a second means for sealing blocking the flow of air from the interior of the container, the second means for sealingly including a vent float for blocking the flow of air, the vent float operating in response to liquid level in the container approaching the air passageway.

11. The volumetric measuring/dispensing device of claim 10 wherein the liquid valve comprises:

a cylindrical portion, the curved portion of the cylindrical portion defining a surface;

a fixed portion having a circular aperture, the cylindrical portion being movably mounted within the circular aperture, the cylindrical portion and the fixed portion each having a plurality of liquid passageways therein; and a means for sealing each liquid passageways in the cylindrical portion to the fixed portion circular aperture, the means for sealing comprising: an annular ring inserted in each liquid passageway adjacent the surface of the cylindrical portion, each liquid passageway having a shoulder, the face of the annular ring adjacent the circular aperture being curved to match the curvature of the circular aperture and the face of the annular ring adjacent the circular aperture having an arcuate groove about its outer circumference; and O-ring being located in the arcuate groove; and a means for biasing the annular ring towards the fixed portion of the liquid valve being located between the shoulder and the annular ring.

12. A volumetric measuring/dispensing device for liquids comprising:

a liquid inlet;

a liquid outlet;

a measuring container having an interior and including a top, a bottom, and a wall joining the top and bottom, the top having a central opening therein, and the bottom having a central opening therein, and including an upper valve housing mounted in the opening in the top and a lower valve housing mounted in the opening in the bottom, the upper valve housing having an air passageway extending vertically therethrough and in fluid communication with the interior of the measuring container adjacent the top thereof, the lower valve housing having at least one liquid passageway extending radially therethrough in fluid communication with the interior of the measuring container at the bottom of the measuring container; and a valve operator comprised of upper and lower valve stems turnably mounted in the upper and lower valve housing respectively and a central conduit connecting the upper valve stem to the lower valve stem, the valve operator being operable between a fill position to establish a filling condition of the device, a closed position to establish a sealingly closed condition of the device, and an emptying position to establish an emptying condition of the device; the upper valve stem having an inlet air aperture communicated with the ambient air, an outlet air aperture communicated with the ambient air; the central conduit being in fluid communication with the liquid inlet; the lower valve stem having at least one liquid fill aperture extending radially of the lower valve stem in fluid communication with the central conduit and having at least one liquid drain channel in fluid communication with the liquid outlet; when the valve operator is in the fill position the liquid fill aperture being in fluid communication with the liquid passageway to permit flow of liquid from the central conduit to the interior of the container, the outlet air aperture being in fluid communication with the air passageway for exhausting air from the interior of the measuring container to the outside ambient air during the filling of the measuring container; when the valve operator is in the closed position air and liquid flow to and from the interior of the measuring container being blocked off by the upper valve stem and the lower valve stem, respectively; and when the valve operator is in the emptying position, the liquid drain channel being in fluid communication with the liquid passageway to permit flow of liquid from the interior of the container to the liquid outlet, the inlet air aperture being in fluid communication with the air passageway for permitting ambient air to enter the interior of the measuring container.

13. The volumetric measuring/dispensing device of claim 12 wherein the container wall is transparent and has graduation markings thereon for indicating the quantity of liquid in the container.

14. The volumetric measuring/dispensing device of claim 12, further comprising:
  a transparent tube external to the measuring container, both ends of the transparent tube being in fluid communication with the measuring container, the transparent tube having graduation markings for indicating the quantity of liquid in the measuring container.

15. The volumetric measuring/dispensing device of claim 12, further comprising:
  two transparent tubes external to the measuring container, one tube being inside the other tube, both ends of the internal tube being in fluid communication with the measuring container; and
  graduation markings being provided proximate the transparent tubes for indicating the quantity of liquid in the measuring container.

16. The volumetric measuring/dispensing device of claim 12, further comprising a handle fixedly attached to the upper valve stem for turning the valve operator, the position of the handle and the valve operator when the valve operator is in the fill position is disposed 90 degrees from the position of the handle and the valve operator when the valve operator is in the emptying position.

17. The volumetric measuring/dispensing device of claim 16 in which the position of the handle and the valve operator when the valve operator is in the closed position is between the positions of the handle and the valve operator when the valve operator is in the fill and emptying positions.

18. The volumetric measuring/dispensing device of claim 12 further comprising a means for sealingly blocking the flow of air from the interior of the container, the means for sealingly blocking the flow of air operating in response to liquid level in the container approaching the air passageway.

19. A volumetric measuring/dispensing device for liquids comprising:
  a measuring container including measuring means for measuring the volume of a quantity of liquid in the container;
  a liquid fill valve movable between a fill position for permitting liquid to flow into the container and a closed position for sealingly blocking the flow of liquid into the container;
  a liquid drain valve movable between a closed position for sealingly blocking the flow of liquid out of the container and an emptying position for permitting liquid to flow out of the container;
  an air valve movable between a fill position for permitting air to exit the container, a closed position for sealingly blocking the flow of air into and out of the container, and an emptying position for permitting ambient air to flow into the container; and
  means for operating simultaneously the liquid fill valve, the liquid drain valve and the air valve selectively to move the liquid fill valve to its fill position while at the same time moving the air valve to its fill position, to move the liquid fill valve to its closed position while at the same time moving the air valve to its closed position, to move the liquid drain valve to its closed position while at the same time moving the air valve to its closed position, and to move the liquid drain valve to its emptying position while at the same time moving the air valve to its emptying position, the means for operating simultaneously the liquid fill valve, the liquid drain valve and the air valve comprising a fluid conduit for conducting fluid external to the measuring container through the liquid fill valve to the interior of the measuring container.

20. The volumetric measuring/dispensing device of claim 19 wherein the measuring means comprises a transparent tube external to the measuring container, both ends of the transparent tube being in fluid communication with the measuring container, the transparent tube having graduation markings for indicating the quantity of liquid in the measuring container.

21. The volumetric measuring/dispensing device of claim 20 wherein the liquid drain valve and the liquid fill valve each comprise:
  a cylindrical portion, the curved portion of the cylindrical portion defining a surface;
  a fixed portion having a circular aperture, the cylindrical portion being movably mounted within the circular aperture, the cylindrical portion and the fixed portion each having a plurality of liquid passageways therein; and
  a means for sealing each liquid passageways in the cylindrical portion to the fixed portion circular aperture, the means for sealing comprising: an annular ring inserted in each liquid passageway adjacent the surface of the cylindrical portion, each liquid passageway having a shoulder, the face of the annular ring adjacent the circular aperture being curved to match the curvature of the circular aperture and the face of the annular ring adjacent the circular aperture having an arcuate groove about its outer circumference; an O-ring being located in the arcuate groove; and a means for biasing the annular ring towards the fixed portion of the liquid valve being located between the shoulder and the annular ring.

22. A volumetric measuring/dispensing device for liquids comprising:
  a liquid inlet;

a liquid outlet;

a measuring container having an interior and including a top, a bottom, and a wall joining the top and bottom, the top having a central opening therein, and the bottom having a central opening therein, and including an upper valve housing mounted in the opening in the top and a lower valve housing mounted in the opening in the bottom, the upper valve housing having an air passageway extending vertically therethrough and in fluid communication with the interior of the measuring container adjacent the top thereof and having at least one liquid fill passageway extending therethrough; the lower valve housing having at least one liquid drain passageway extending radially therethrough in fluid communication with the interior of the measuring container at the bottom of the measuring container; and a valve operator comprised of upper and lower valve stems turnably mounted in the upper and lower valve housing respectively and a central conduit connecting the upper valve stem to the lower valve stem, the valve operator being operable between a fill position to establish a filling condition of the device, a closed position to establish a sealingly closed condition of the device, and an emptying position to establish an emptying condition of the device; the end of the central conduit proximate the lower valve stem being in fluid communication with the interior of the measuring container, the central conduit being in fluid communication with the liquid fill passageway; the upper valve stem having an inlet air aperture communicated with the ambient air, an outlet air aperture communicated with the ambient air, and at least one liquid fill aperture extending radially of the upper valve stem in fluid communication with the liquid inlet; the lower valve stem having at least one liquid drain channel in fluid communication with the liquid outlet; when the valve operator is in the fill position the liquid fill aperture being in fluid communication with the liquid fill passageway to permit flow of liquid from the liquid inlet through the central conduit to the interior of the container, the outlet air aperture being in fluid communication with the air passageway for exhausting air from the interior of the measuring container to the outside ambient air during the filling of the measuring container; when the valve operator is in the closed position liquid and air flow to and from the interior of the measuring container being blocked off by the upper valve stem and the lower valve stem; and when the valve operator is in the emptying position, the liquid drain channel being in fluid communication with the liquid drain passageway to permit flow of liquid from the interior of the container to the liquid outlet, the inlet air aperture being in fluid communication with the air passageway for permitting ambient air to enter the interior of the measuring container.

23. The volumetric measuring/dispensing device of claim 22 wherein the container wall is transparent and has graduation markings thereon for indicating the quantity of liquid in the container.

24. The volumetric measuring/dispensing device of claim 22, further comprising:

a transparent tube external to the measuring container, both ends of the transparent tube being in fluid communication with the measuring container, the transparent tube having graduation markings for indicating the quantity of liquid in the measuring container.

* * * * *